US012604248B2

(12) United States Patent
Mihály et al.

(10) Patent No.: US 12,604,248 B2
(45) Date of Patent: Apr. 14, 2026

(54) RE-ANCHORING WITH SMF RE-SELECTION

(71) Applicant: Telefonaktiebolaget LM Ericsson (publ), Stockholm (SE)

(72) Inventors: Attila Mihály, Dunakeszi (HU); Magnus Hallenstål, Täby (SE); Maria Luisa Mas Rosique, Tres Cantos (ES); Magnus Olsson, London (GB)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 440 days.

(21) Appl. No.: 18/020,639

(22) PCT Filed: Aug. 11, 2021

(86) PCT No.: PCT/IB2021/057418
§ 371 (c)(1),
(2) Date: Feb. 10, 2023

(87) PCT Pub. No.: WO2022/034525
PCT Pub. Date: Feb. 17, 2022

(65) Prior Publication Data
US 2023/0337087 A1 Oct. 19, 2023

Related U.S. Application Data

(60) Provisional application No. 63/064,223, filed on Aug. 11, 2020.

(51) Int. Cl.
*H04W 36/12* (2009.01)
*H04W 36/00* (2009.01)

(52) U.S. Cl.
CPC ....... *H04W 36/12* (2013.01); *H04W 36/0033* (2013.01); *H04W 36/125* (2018.08)

(58) Field of Classification Search
CPC ............ H04W 36/0016; H04W 36/12; H04W 36/125; H04W 36/0033; H04W 36/0011; H04W 36/38; H04W 36/22; H04W 36/322
See application file for complete search history.

(56) References Cited

U.S. PATENT DOCUMENTS

2018/0192471 A1* 7/2018 Li ......................... H04W 12/06
2018/0324646 A1* 11/2018 Lee ................... H04W 36/0011
(Continued)

FOREIGN PATENT DOCUMENTS

CN 110557846 A 12/2019
CN 110650504 A 1/2020
(Continued)

OTHER PUBLICATIONS

Author Unknown, "Technical Specification Group Services and System Aspects; Study on enhancement of support for Edge Computing in 5G Core network (5GC) (Release 17)," Technical Report 23.748, Version 0.4.0, Jun. 2020, 3GPP Organizational Partners, 189 pages.
(Continued)

*Primary Examiner* — Allahyar Kasraian
(74) *Attorney, Agent, or Firm* — Sonoda & Kobayashi Intellectual Property Law; Sarvajit S. Patil

(57) ABSTRACT

Re-anchoring with Session Management Function (SMF) re-selection is disclosed herein. According to some embodiments, if, for an existing User Equipment (UE) Packet Data Unit (PDU) session, an SMF determines that the current PDU Session Anchor (PSA) for the UE PDU Session is to be relocated and further determines that relocation involves an SMF re-selection, then the SMF initiates re-establishment of the PDU session. During re-establishment, the SMF conveys to an Access and Mobility Management Function (AMF) Edge Computing (EC) context information relevant
(Continued)

for the new PDU session. The AMF in some embodiments may use some of this information related to the location of the PSA (DNAI) to select the new SMF, and passes this information to the selected SMF for the new PDU session. Based on the information received, the new SMF in some embodiments establishes the new PDU session and selects and configures the PSA(s) for the new session.

11 Claims, 8 Drawing Sheets

(56)                 References Cited

U.S. PATENT DOCUMENTS

| | | | | |
|---|---|---|---|---|
| 2019/0090164 | A1* | 3/2019 | Ding | H04W 76/11 |
| 2019/0261260 | A1* | 8/2019 | Dao | H04W 8/20 |
| 2020/0015131 | A1* | 1/2020 | Ying | H04W 36/0033 |
| 2020/0323029 | A1* | 10/2020 | Lu | H04W 76/25 |
| 2021/0385283 | A1* | 12/2021 | Talebi Fard | H04W 76/10 |
| 2022/0191292 | A1* | 6/2022 | Skubic | H04L 67/52 |

FOREIGN PATENT DOCUMENTS

| | | |
|---|---|---|
| CN | 110972126 A | 4/2020 |
| WO | 2018111029 A1 | 6/2018 |

OTHER PUBLICATIONS

Author Unknown, "Technical Specification Group Core Network and Terminals; Bearer-independent circuit-switched core network; Stage 2 (Release 16)," Technical Specification 23.205, Version 16.0.0, Jul. 2020, 3GPP Organizational Partners, 272 pages.

Author Unknown, "Technical Specification Group Services and System Aspects; System architecture for the 5G System (5GS); Stage 2 (Release 16)," Technical Specification 23.501, Version 16.5.0, Jul. 2020, 3GPP Organizational Partners, 441 pages.

Author Unknown, "Technical Specification Group Services and System Aspects; Procedures for the 5G System; Stage 2 (Release 15)," Technical Specification 23.502, Version 15.1.0, Mar. 2018, 3GPP Organizational Partners, 285 pages.

Author Unknown, "Technical Specification Group Services and System Aspects; Procedures for the 5G System (5GS); Stage 2 (Release 16)," Technical Specification 23.502, Version 16.5.0, Jul. 2020, 3GPP Organizational Partners, 594 pages.

Ericsson, "S2-200xxxx: KI #1, KI#2, KI#5, Sol #12: Updates to extend the solution," 3GPP TSG-SA/WG2 Meeting #140E, Electronic Meeting, Aug. 2020, 8 pages.

Nokia, et al., "C4-187495: SMF Reallocation requested Indication," 3GPP TSG RAN CT WG4 Meeting #86bis, Oct. 15-19, 2018, Vilnius, Lithuania, 3 pages.

International Search Report and Written Opinion for International Patent Application No. PCT/IB2021/057418, mailed Nov. 5, 2021, 18 pages.

Written Opinion for International Patent Application No. PCT/IB2021/057418, mailed Jun. 23, 2022, 7 pages.

International Preliminary Report on Patentability for International Patent Application No. PCT/IB2021/057418, mailed Nov. 15, 2022, 25 pages.

First Office Action for Chinese Patent Application No. 202180055389.8, mailed Aug. 28, 2025, 24 pages.

Intention to Grant for European Patent Application No. 21758775.7, mailed Aug. 5, 2025, 7 pages.

* cited by examiner

RE-ANCHORING WITH SMF RE-SELECTION

RELATED APPLICATIONS

This application is a 35 U.S.C. § 371 national phase filing of International Application No. PCT/IB2021/057418, filed Aug. 11, 2021, which claims the benefit of provisional patent application Ser. No. 63/064,223, filed Aug. 11, 2020, the disclosures of which are hereby incorporated herein by reference in their entireties.

TECHNICAL FIELD

The present disclosure relates to connectivity for Edge Computing (EC) in cellular communications networks.

BACKGROUND

The current disclosure relates to functionality to support Edge Computing (EC) in the Third Generation Partnership Project (3GPP). The Fifth Generation (5G) network architecture is defined by 3GPP Technical Specification (TS) 23.501. The role of the Network Functions are defined as follows:

The Session Management Function (SMF) is responsible for session establishment, modification, and release (including selection and control of User Plan Function (UPF) entities); maintaining the topology of the involved Packet Data Unit (PDU) Session Anchor (PSA) UPFs; and establishing and releasing the tunnel between an Access Network (AN) and a UPF and between UPFs. The SMF also configures traffic forwarding at a UPF. The SMF interacts with the UPF over the N4 Reference point using Packet Forwarding Control Protocol (PFCP) procedures.

The User Plane Function (UPF) handles the user data traffic. Among other functionality, the UPF provides an external PDU Session point of interconnection to a Data Network (DN) (e.g., a PSA), and performs packet routing and forwarding (e.g., by supporting an Uplink Classifier (UL CL) to route traffic flows to an instance of a DN, and/or supporting a branching point to support a multi-homed PDU session).

The Policy Control Function (PCF) supports a unified policy framework to govern the network behavior. Specifically, the PCF provides Policy and Charging Control (PCC) rules to the Policy and Charging Enforcement Function (PCEF) (i.e., the SMF/UPF that enforces policy and charging decisions according to provisioned PCC rules).

The Network Exposure Function (NEF) supports different functionality, and specifically in the context of this disclosure, the NEF acts as the entry point into an operator's network, enabling an external Application Function (AF) (such as a content provider) to interact with the 3GPP core network through NEF.

The AF sends requests to influence SMF routing decisions for traffic constituting a PDU session. The AF requests may influence UPF selection or re-selection, and may allow routing of user traffic via a local access to a DN (e.g., identified by a Data Network Access Identifier, or DNAI). The AF may communicate directly with the PCF in the Service-Based Architecture (SBA) domain or indirectly through the NEF (i.e., using an Application Programming Interface (API) to the NEF that conveys the AF communication to the PCF).

As stated in section 5.13 of the 3GPP TS 23.501, EC enables operator and third-party services to be hosted close to the user equipment (UE) access point of attachment, to achieve an efficient service delivery through the reduced end-to-end latency and load on the transport network. The 5G core network selects a UPF close to the UE and executes the traffic steering from the UPF to the local DN via an N6 interface. Section 5.13. of TS 23.501 also defines a number of enablers that alone or in combination support EC, including the following:

User plane selection or re-selection: the 5G Core Network selects or re-selects a UPF to route the user traffic to the local DN, as described in section 6.3.3 of TS 23.501; and Local Routing and Traffic Steering: the 5G Core Network selects the traffic to be routed to the applications in the local DN, which may include the use of a single PDU Session with multiple PDU Session Anchor(s) (UL CL/IP v6 multi-homing) as described in section 5.6.4 of TS 23.501.

The detailed functionality to provide session continuity, service continuity, and UP path management for the above use cases is described in TS 23.502, Clause 4.3.5.

At least three connectivity models have been found relevant for Edge computing. They are captured in clause 4.2 of 3GPP Technical Report (TR) 23.748, and are illustrated in FIG. 1. As seen in FIG. 1, these connectivity models include the following:

Distributed Anchor Point: the PDU Session anchor (PSA) is moved far out in the network, to the local sites. It is the same for all the user PDU session traffic. Re-anchoring (i.e., PDU Session and Service Continuity (SSC) mode #2 and SSC #3) is used to optimize traffic routing for all applications when moving long distances.

Session Breakout: The PDU session has a PSA in a central site and a PDU Session anchor in the local site. Only one of them provides the IP anchor point. The EC application traffic is selectively diverted to the local PDU Session anchor using UL Classifier or multihoming BP technology. Re-anchoring of the local PDU Session anchor is used to optimize traffic routing for locally diverted traffic as the user moves.

Multiple PDU sessions: EC applications use a specific PDU session with the PDU Session anchor in the local site. The rest of applications use a PDU Session with a central PDU Session anchor. The mapping between applications and PDU sessions is steered by the UE Route Selection Policy (URSP) rules. Re-anchoring (i.e., PDU session modes SSC #2 and SSC #3) is used to optimize traffic routing for EC applications as the user moves.

Different solutions are proposed in TR 23.748 for EAS discovery and selection for all three connectivity models above. Also, different methods are proposed for handling seamless EAS relocation. These methods could imply UP path management solutions in 5GC for some existing PDU sessions, e.g., changing the existing PSA or adding a new PSA.

SUMMARY

Methods and apparatus are disclosed herein for perform re-anchoring with Session Management Function (SMF) re-selection. Embodiments of a method performed in a core network of a cellular communications system to perform re-anchoring with SMF re-selection are disclosed herein. In some embodiments, the method comprises, at a first SMF, determining that a current Protocol Data Unit (PDU) Session Anchor (PSA) for a User Equipment (UE) PDU session is to be relocated, and that relocation requires an SMF re-selection. The method further comprises initiating re-establishment of the UE PDU session, wherein initiating comprises conveying, to an Access and Mobility Management Function (AMF) Edge Computing (EC) dynamic context information relevant for a new UE PDU session. The method also comprises, at the AMF, receiving the EC dynamic context information from the first SMF. The method additionally comprises selecting a second SMF based on the EC dynamic context information. The method further comprises transmitting the EC dynamic context information to the second SMF. The method also comprises, at the second SMF, receiving the EC dynamic context information from the AMF. The method additionally comprises establishing the new UE PDU session based on the EC dynamic context information, wherein establishing the new UE PDU session comprises selecting a PSA for the new UE PDU session, configuring the PSA for the new UE PDU session. Some embodiments may provide that the EC dynamic context information comprises one or more of one or more Data Network Access Identifiers (DNAIs) for a corresponding one or more PSAs; one or more traffic filters; N6 routing information; Domain Name System (DNS) configuration information; Subscribed Application Function (AF) information; or related local policies.

Embodiments of a method performed in a first SMF in a core network of a cellular communications system to perform re-anchoring with SMF re-selection are also disclosed herein. In some embodiments, the method comprises determining that a current PSA for a UE PDU session is to be relocated, and that relocation requires an SMF re-selection. The method further comprises initiating re-establishment of the UE PDU session, wherein initiating comprises conveying, to an AMF EC dynamic context information relevant for a new UE PDU session.

Embodiments of a network node for implementing a first SMF for a core network of a cellular communications system where the first SMF is enabled to perform re-anchoring with SMF re-selection are also disclosed herein. In some embodiments, the network node is adapted to determine that a current PSA for a UE PDU session is to be relocated, and that relocation requires an SMF re-selection. The network is further adapted to initiate re-establishment of the UE PDU session, wherein initiating comprises conveying, to an AMF EC dynamic context information relevant for a new UE PDU session.

Embodiments of a network node for implementing a first SMF for a core network of a cellular communications system where the SMF is enabled to perform re-anchoring with SMF re-selection are also disclosed herein. In some embodiments, the network node comprises a network interface, and processing circuitry associated with the network interface. The processing circuitry is configured to determine that a current PSA for a UE PDU session is to be relocated, and that relocation requires an SMF re-selection. The processing circuitry is further configured to initiate re-establishment of the UE PDU session, wherein initiating comprises conveying, to an AMF EC dynamic context information relevant for a new UE PDU session.

Embodiments of a method performed in an AMF in a core network of a cellular communications system to perform re-anchoring with SMF re-selection are also disclosed herein. In some embodiments, the method comprises receiving EC dynamic context information from a first SMF. The method further comprises selecting a second SMF based on the EC dynamic context information. The method also comprises transmitting the EC dynamic context information to the second SMF. Some embodiments may provide that selecting the second SMF based on the EC dynamic context information comprises determining that the EC dynamic context information comprises an indication to use a DNAI for a new UE PDU session, using the DNAI when selecting the second SMF.

Embodiments of a network node for implementing an AMF for a core network of a cellular communications system where the AMF is enabled to perform re-anchoring with SMF re-selection are also disclosed herein. In some embodiments, the network node is adapted to receive EC dynamic context information from a first SMF. The network node is further adapted to select a second SMF based on the EC dynamic context information. The network node is also adapted to transmit the EC dynamic context information to the second SMF. Some embodiments may provide that the network node is additionally adapted to perform any of the methods attributed to the network node above.

Embodiments of a network node for implementing an AMF for a core network of a cellular communications system where the AMF is enabled to perform re-anchoring with Session Management Function, SMF re-selection are also disclosed herein. In some embodiments, the network node comprises a network interface, and processing circuitry associated with the network interface. The processing circuitry is configured to receive EC dynamic context information from a first SMF. The processing circuitry is further configured to select a second SMF based on the EC dynamic context information. The processing circuitry is also configured to transmit the EC dynamic context information to the second SMF. Some embodiments may provide that the processing circuitry is further configured to perform any of the methods attributed to the network node above.

Embodiments of a method performed in a second SMF in a core network of a cellular communications system to perform re-anchoring with SMF re-selection are also disclosed herein. In some embodiments, the method comprises receiving EC dynamic context information from an AMF. The method further comprises establishing a new UE PDU session based on the EC dynamic context information. Some embodiments may provide that establishing the new UE PDU session based on the EC dynamic context information comprises selecting a PSA for the new UE PDU session, and configuring the PSA for the new UE PDU session.

Embodiments of a network node for implementing a second SMF for a core network of a cellular communications system where the second SMF is enabled to perform re-anchoring with SMF re-selection are also disclosed herein. In some embodiments, the network node is adapted to receive EC dynamic context information from an AMF. The network node is further adapted to establish a new UE PDU session based on the EC dynamic context information. Some embodiments may provide that the network node is also adapted to perform any of the methods attributed to the network node above.

Embodiments of a network node for implementing a second SMF for a core network of a cellular communications system where the SMF is enabled to perform re-anchoring with SMF re-selection are also disclosed herein. In some embodiments, the network node comprises a network interface, and processing circuitry associated with the network interface. The processing circuitry is configured to receive EC dynamic context information from an AMF. The processing circuitry is further configured to establish a new UE PDU session based on the EC dynamic context infor-
mation. Some embodiments may provide that the processing
circuitry is also configured to perform any of the methods
attributed to the network node above. In some embodiments,
the EC dynamic context information comprises one or more
of one or more DNAIs for a corresponding one or more PDU
Session Anchors, PSAs; one or more traffic filters; N6
routing information; DNS configuration information Sub-
scribed AF information; and related local policies.

BRIEF DESCRIPTION OF THE DRAWINGS

The accompanying drawing figures incorporated in and
forming a part of this specification illustrate several aspects
of the disclosure, and together with the description serve to
explain the principles of the disclosure.

DETAILED DESCRIPTION

Figure 1:
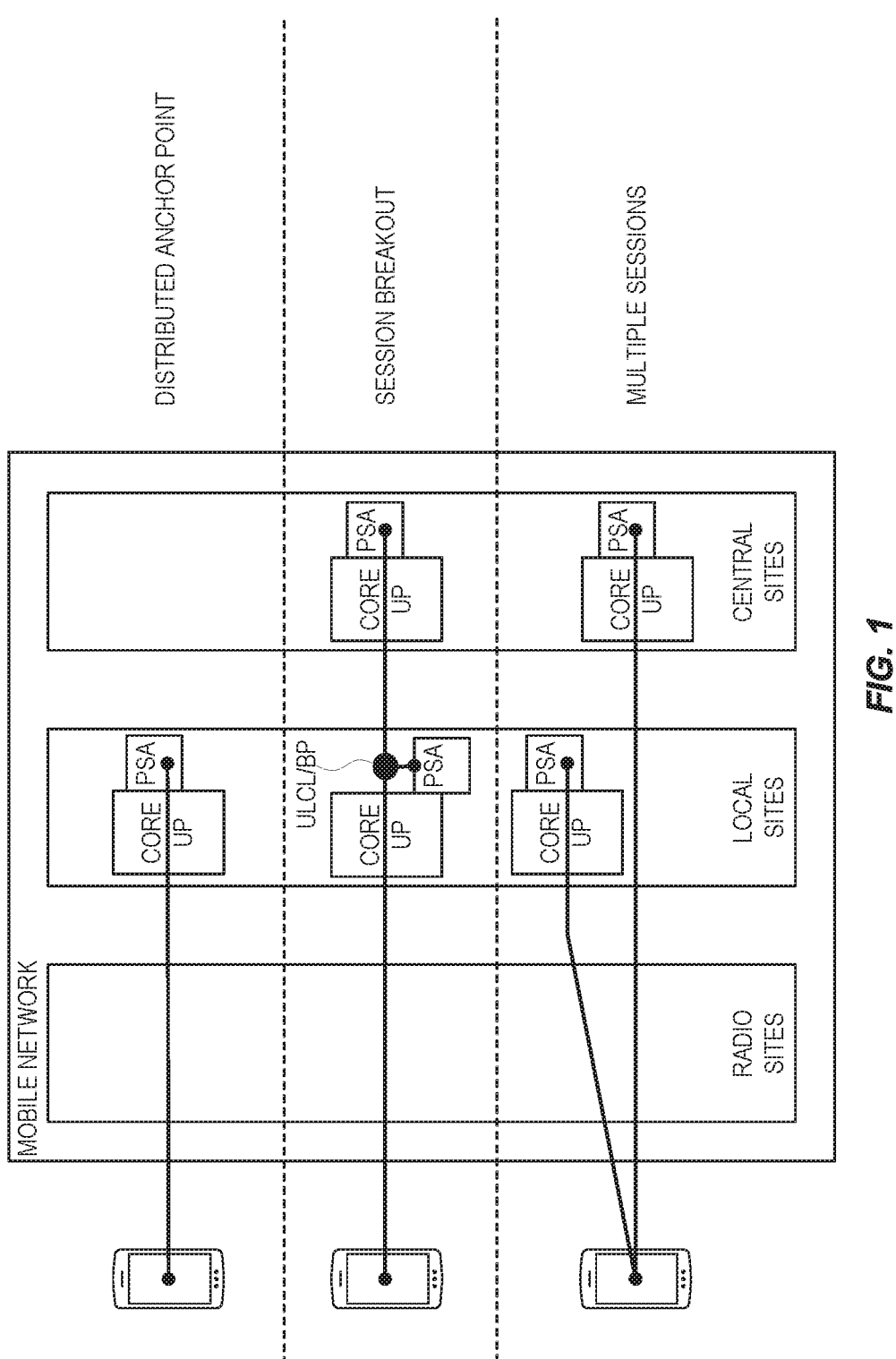
FIG. 1, reproduced from clause 4.2 of the Third Genera-
tion Partnership Project (3GPP) Technical Report (TR)
23.748, illustrate three connectivity models have relevant for
Edge Computing (EC)

The embodiments set forth below represent information to
enable those skilled in the art to practice the embodiments
and illustrate the best mode of practicing the embodiments.
Upon reading the following description in light of the
accompanying drawing figures, those skilled in the art will
understand the concepts of the disclosure and will recognize
applications of these concepts not particularly addressed
herein. It should be understood that these concepts and
applications fall within the scope of the disclosure.

There currently exist certain challenge(s) with existing
approaches. Presently, the information needed for Packet
Data Unit (PDU) Session Anchor (PSA) change or addition
of a new PSA is either pre-configured in the Session Man-
agement Function (SMF) or received by the SMF from the
Policy Control Function (PCF) via Policy and Charging
Control (PCC) rules. These PCC rules are conveyed to the
SMF either at PDU session establishment or during the PDU
session (e.g., based on a trigger from an Application Func-
tion (AF)), and they include a Data Network Access Iden-
tifier (DNAI) indication for which the SMF possesses local configuration that maps the DNAI to a PSA location. Addi-
tionally, the SMF may receive other information related to
the configuration needed for the new PSA such as traffic
filters, N6 traffic handling rules, etc.

There exist, however, cases in which the same SMF may
not be able to handle a required PSA change, such as the
following:

Domain Name System (DNS)-triggered or AF-requested
DNAI is being supported using PDU Session breakout.
At mobility, the new User Equipment (UE) location is
outside the SMF service area. PDU session is SSC #2
or SSC #3.

DNS-triggered or AF-requested DNAI is being supported
with distributed anchor (i.e., the session was re-an-
chored to the edge to satisfy the request). At mobility,
the new UE location is outside the SMF service area.
PDU session is SSC #2 or SSC #3.

DNS-triggered or AF-requested DNAI is to be supported
with distributed anchor by re-anchoring at the edge.
The PDU session is SSC #2.

If a DNS Query related to an Edge Computing (EC)
Application Fully Qualified Domain Name (FQDN)
can trigger in-SMF selection of an Edge PSA when the
SMF does not control any local PSA, or if an AF
requests a DNAI that is not controlled by the SMF (e.g.,
because it represents a "campus" with its own SMF
(See KI #5 in TR 23.748), for PDU sessions mode SSC
2 or SSC #3 where re-anchoring to the edge with
reallocation of SMF is an option.

In these re-anchoring scenarios with SMF re-selection,
the Access and Mobility Management Function (AMF)
needs to select a new SMF that is able to control UPFs that
support PSA(s) with N6 access to the DN at the locations
requested. In some cases, e.g., the "campus" scenario above,
the AMF may not have enough information to select the
right SMF. Additionally, the new SMF needs to have all
information needed to instruct the UPF and setup the new
PSA(s) at the location requested and according to the
information in the trigger/request. However, the procedures
involved in the re-anchoring do not convey today the
information needed to guarantee the above.

Accordingly, certain aspects of the present disclosure and
their embodiments may provide solutions to the aforemen-
tioned or other challenges. There are, proposed herein,
various embodiments which address one or more of the
issues disclosed herein. In particular, methods and apparatus
for re-anchoring with SMF re-selection are disclosed.
According to some embodiments, if, for an existing UE
PDU session, the SMF decides that the current PSA for the
UE PDU Session is to be relocated and this involves an SMF
re-selection, then it initiates re-establishment of the PDU
session during which it conveys to an AMF EC context
information relevant for the new PDU session. The AMF
may use some of this information related to the location of
the PSA (DNAI) to select the new SMF and passes this
information to the selected SMF for the new PDU session.
Based on the information received, the new SMF establishes
the new PDU session and selects and configures the PSA(s)
for the new session.

Certain embodiments may provide one or more of the
following technical advantage(s). Embodiments disclosed
herein enable relocation of the PSA(s) also in the cases when
a new SMF is selected for the new session. In this manner,
embodiments disclosed herein extend the applicability of the
different EC-related EAS selection and re-selection use
cases, and offer alternative solutions for other use cases (e.g.,
a Campus scenario). Embodiments disclosed herein can be also useful in other, non-EC related scenarios where the PSA should not necessarily be changed or added to optimize the PSA placement, but for other reasons (e.g., when UE IPv4 reconfiguration is needed that requires SSC Mode 2 re-anchoring with re-selection of the SMF).

Before discussing methods and apparatus for re-anchoring with SMF re-selection in greater detail, exemplary cellular communications systems in which some embodiments of the present disclosure may be implemented are first discussed. In this regard, the following terms are defined:

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Figure 2:
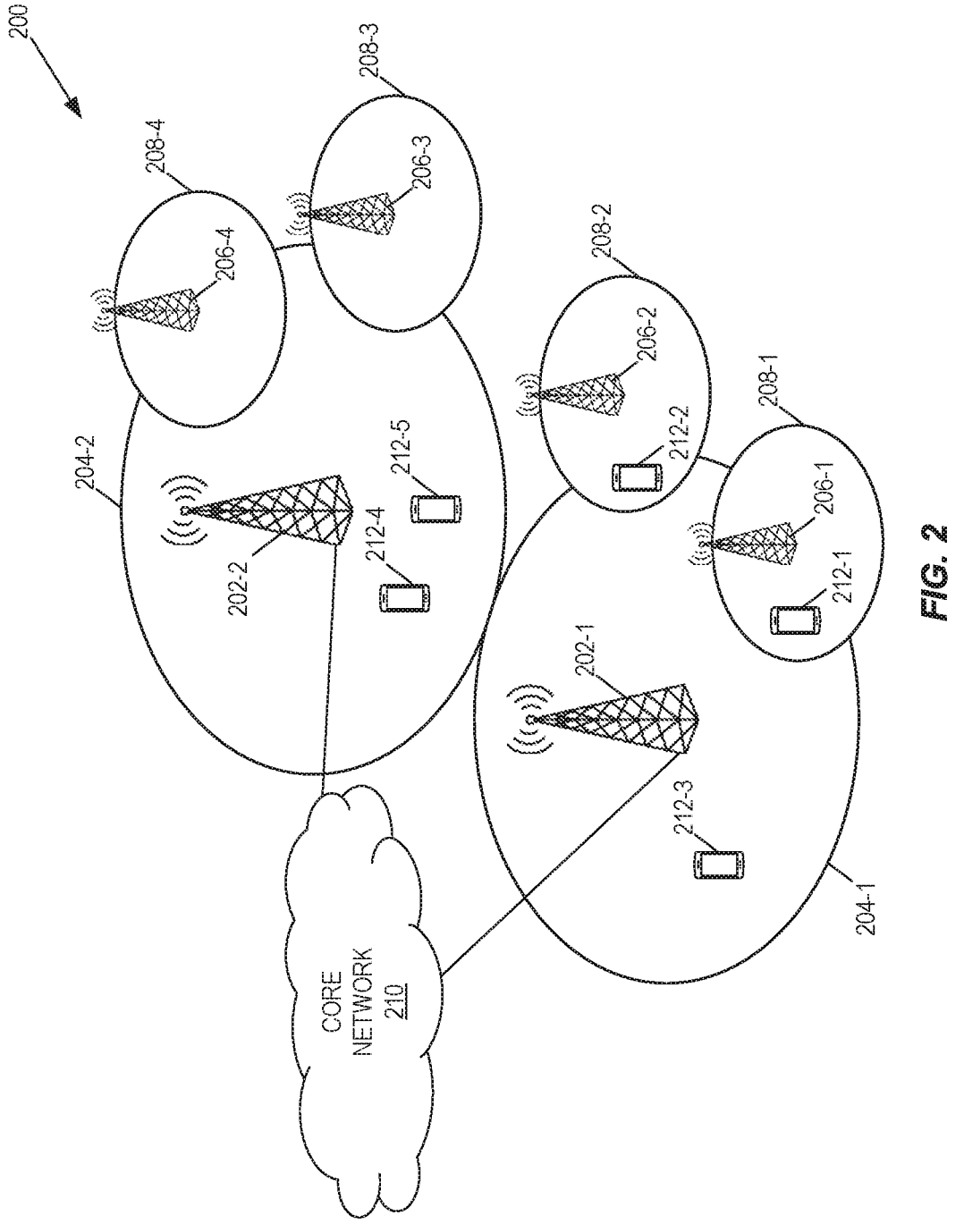
FIG. 2 illustrates one example of a cellular communica-
tions system according to some embodiments of the present
disclosure.

FIG. 2 illustrates one example of a cellular communications system 200 in which embodiments of the present disclosure may be implemented. In the embodiments described herein, the cellular communications system 200 is a 5G system (5GS) including a Next Generation RAN (NG-RAN) and a 5G Core (5GC) or an Evolved Packet System (EPS) including an Evolved Universal Terrestrial RAN (E-UTRAN) and a Evolved Packet Core (EPC). In this example, the RAN includes base stations 202-1 and 202-2, which in the 5GS include NR base stations (gNBs) and optionally next generation eNBs (ng-eNBs) (e.g., LTE RAN nodes connected to the 5GC) and in the EPS include eNBs, controlling corresponding (macro) cells 204-1 and 204-2. The base stations 202-1 and 202-2 are generally referred to herein collectively as base stations 202 and individually as base station 202. Likewise, the (macro) cells 204-1 and 204-2 are generally referred to herein collectively as (macro) cells 204 and individually as (macro) cell 204. The RAN may also include a number of low power nodes 206-1 through 206-4 controlling corresponding small cells 208-1 through 208-4. The low power nodes 206-1 through 206-4 can be small base stations (such as pico or femto base stations) or Remote Radio Heads (RRHs), or the like. Notably, while not illustrated, one or more of the small cells 208-1 through 208-4 may alternatively be provided by the base stations 202. The low power nodes 206-1 through 206-4 are generally referred to herein collectively as low power nodes 206 and individually as low power node 206. Likewise, the small cells 208-1 through 208-4 are generally referred to herein collectively as small cells 208 and individually as small cell 208. The cellular communications system 200 also includes a core network 210, which in the 5G System (5GS) is referred to as the 5GC. The base stations 202 (and optionally the low power nodes 206) are connected to the core network 210.

The base stations 202 and the low power nodes 206 provide service to wireless communication devices 212-1 through 212-5 in the corresponding cells 204 and 208. The wireless communication devices 212-1 through 212-5 are generally referred to herein collectively as wireless communication devices 212 and individually as wireless communication device 212. In the following description, the wireless communication devices 212 are oftentimes UEs, but the present disclosure is not limited thereto.

Figure 3:
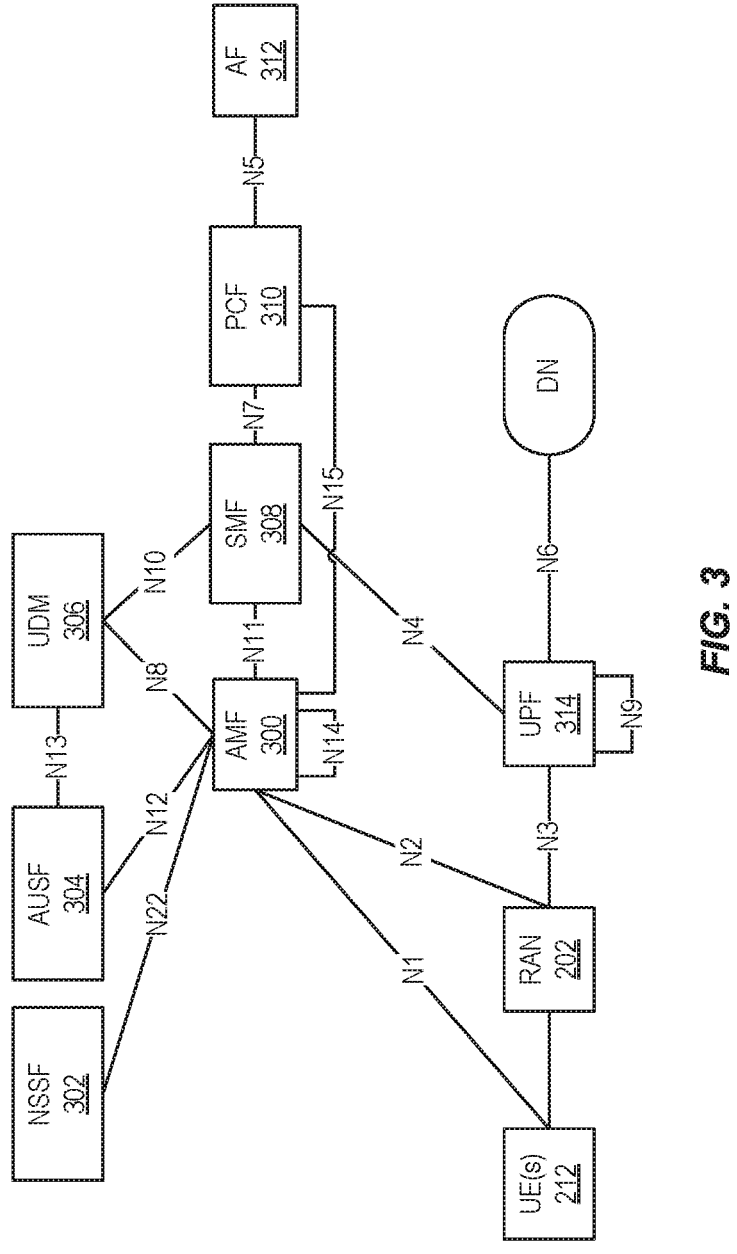
FIGS. 3 and 4 illustrate example embodiments in which
the cellular communication system of FIG. 3 is a Fifth
Generation (5G) System (5GS)

FIG. 3 illustrates a wireless communication system represented as a 5G network architecture composed of core Network Functions (NFs), where interaction between any two NFs is represented by a point-to-point reference point/interface. FIG. 3 can be viewed as one particular implementation of the system 200 of FIG. 2.

Seen from the access side, the 5G network architecture shown in FIG. 3 comprises a plurality of UEs 212 connected to either a RAN 202 or an Access Network (AN) as well as an AMF 300. Typically, the RAN 202 comprises base stations, e.g., such as eNBs or gNBs or similar. Seen from the core network side, the 5GC NFs shown in FIG. 3 include an NSSF 302, an AUSF 304, a UDM 306, the AMF 300, a SMF 308, a PCF 310, and an Application Function (AF) 312.

Reference point representations of the 5G network architecture are used to develop detailed call flows in the normative standardization. The N1 reference point is defined to carry signaling between the UE 212 and AMF 300. The reference points for connecting between the AN 202 and AMF 300 and between the AN 202 and UPF 314 are defined as N2 and N3, respectively. There is a reference point, N11, between the AMF 300 and SMF 308, which implies that the SMF 308 is at least partly controlled by the AMF 300. N4 is used by the SMF 308 and UPF 314 so that the UPF 314 can be set using the control signal generated by the SMF 308, and the UPF 314 can report its state to the SMF 308. N9 is the reference point for the connection between different UPFs 314, and N14 is the reference point connecting between different AMFs 300, respectively. N15 and N7 are defined since the PCF 310 applies policy to the AMF 300 and SMF 308, respectively. N12 is required for the AMF 300 to perform authentication of the UE 212. N8 and N10 are defined because the subscription data of the UE 212 is required for the AMF 300 and SMF 308.

The 5GC network aims at separating user plane (UP) and control plane (CP). The UP carries user traffic while the CP carries signaling in the network. In FIG. 3, the UPF 314 is in the UP and all other NFs, i.e., the AMF 300, SMF 308, PCF 310, AF 312, NSSF 302, AUSF 304, and UDM 306, are in the CP. Separating the UP and CP guarantees each plane resource to be scaled independently. It also allows UPFs to be deployed separately from CP functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF 300 and SMF 308 are independent functions in the CP. Separated AMF 300 and SMF 308 allow independent evolution and scaling. Other CP functions like the PCF 310 and AUSF 304 can be separated as shown in FIG. 3. Modularized function design enables the 5GC network to support various services flexibly.

Each NF interacts with another NF directly. It is possible to use intermediate functions to route messages from one NF to another NF. In the CP, a set of interactions between two NFs is defined as service so that its reuse is possible. This service enables support for modularity. The UP supports interactions such as forwarding operations between different UPFs.

Figure 4:
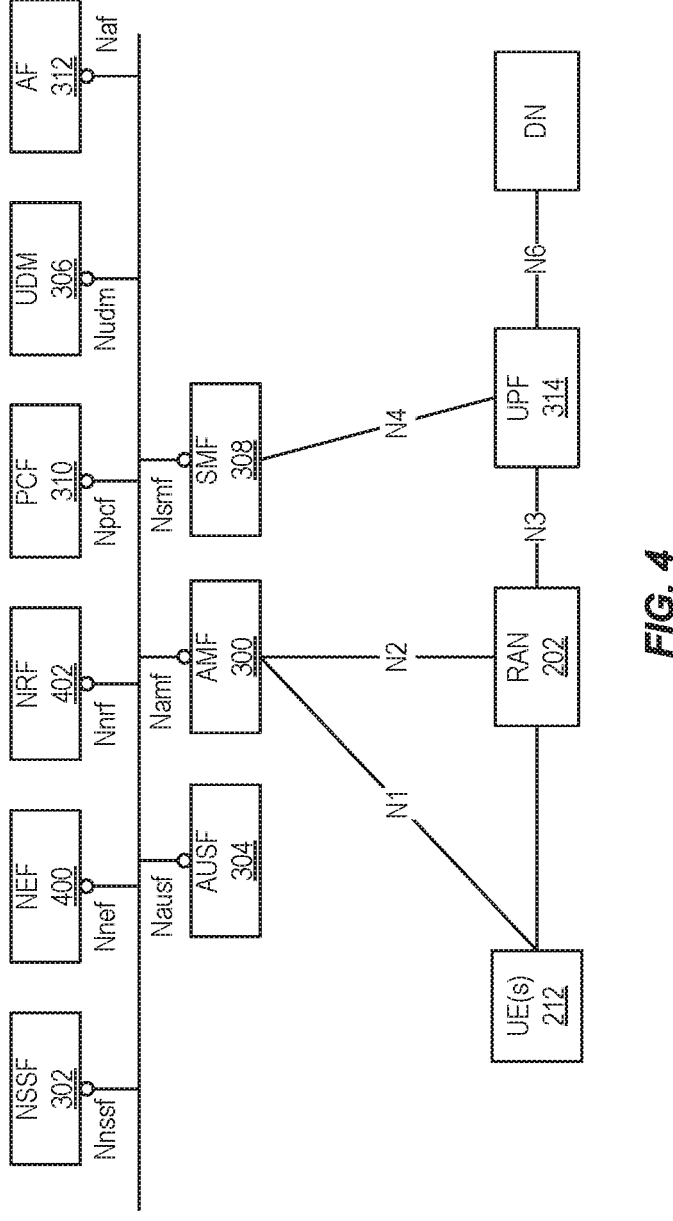

FIG. 4 illustrates a 5G network architecture using service-based interfaces between the NFs in the CP, instead of the point-to-point reference points/interfaces used in the 5G network architecture of FIG. 3. However, the NFs described above with reference to FIG. 3 correspond to the NFs shown in FIG. 4. The service(s) etc. that an NF provides to other authorized NFs can be exposed to the authorized NFs through the service-based interface. In FIG. 4, the service based interfaces are indicated by the letter "N" followed by the name of the NF, e.g., Namf for the service-based interface of the AMF 300 and Nsmf for the service-based interface of the SMF 308, etc. The NEF 400 and the NRF 402 in FIG. 4 are not shown in FIG. 3 discussed above. However, it should be clarified that all NFs depicted in FIG. 3 can interact with the NEF 400 and the NRF 402 of FIG. 4 as necessary, though not explicitly indicated in FIG. 3.

Some properties of the NFs shown in FIGS. 3 and 4 may be described in the following manner. The AMF 300 provides UE-based authentication, authorization, mobility management, etc. A UE 212 even using multiple access technologies is basically connected to a single AMF 300 because the AMF 300 is independent of the access technologies. The SMF 308 is responsible for session management and allocates Internet Protocol (IP) addresses to UEs. It also selects and controls the UPF 314 for data transfer. If a UE 212 has multiple sessions, different SMFs 308 may be allocated to each session to manage them individually and possibly provide different functionalities per session. The AF 312 provides information on the packet flow to the PCF 310 responsible for policy control in order to support QoS. Based on the information, the PCF 310 determines policies about mobility and session management to make the AMF 300 and SMF 308 operate properly. The AUSF 304 supports authentication function for UEs or similar and thus stores data for authentication of UEs or similar while the UDM 306 stores subscription data of the UE 212. The Data Network (DN), not part of the 5GC network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

As discussed above, in re-anchoring scenarios with SMF re-selection, the AMF needs to select a new SMF that is able to control UPFs that support PSA(s) with N6 access to the DN at the locations requested. However, in some scenarios, the AMF may not have enough information to select the right SMF. Additionally, the new SMF needs to have all information needed to instruct the UPF and set up the new PSA(s) at the location requested and according to the information in the trigger/request. However, the procedures involved in the re-anchoring do not convey today the information needed to guarantee the above.

Figure 5:
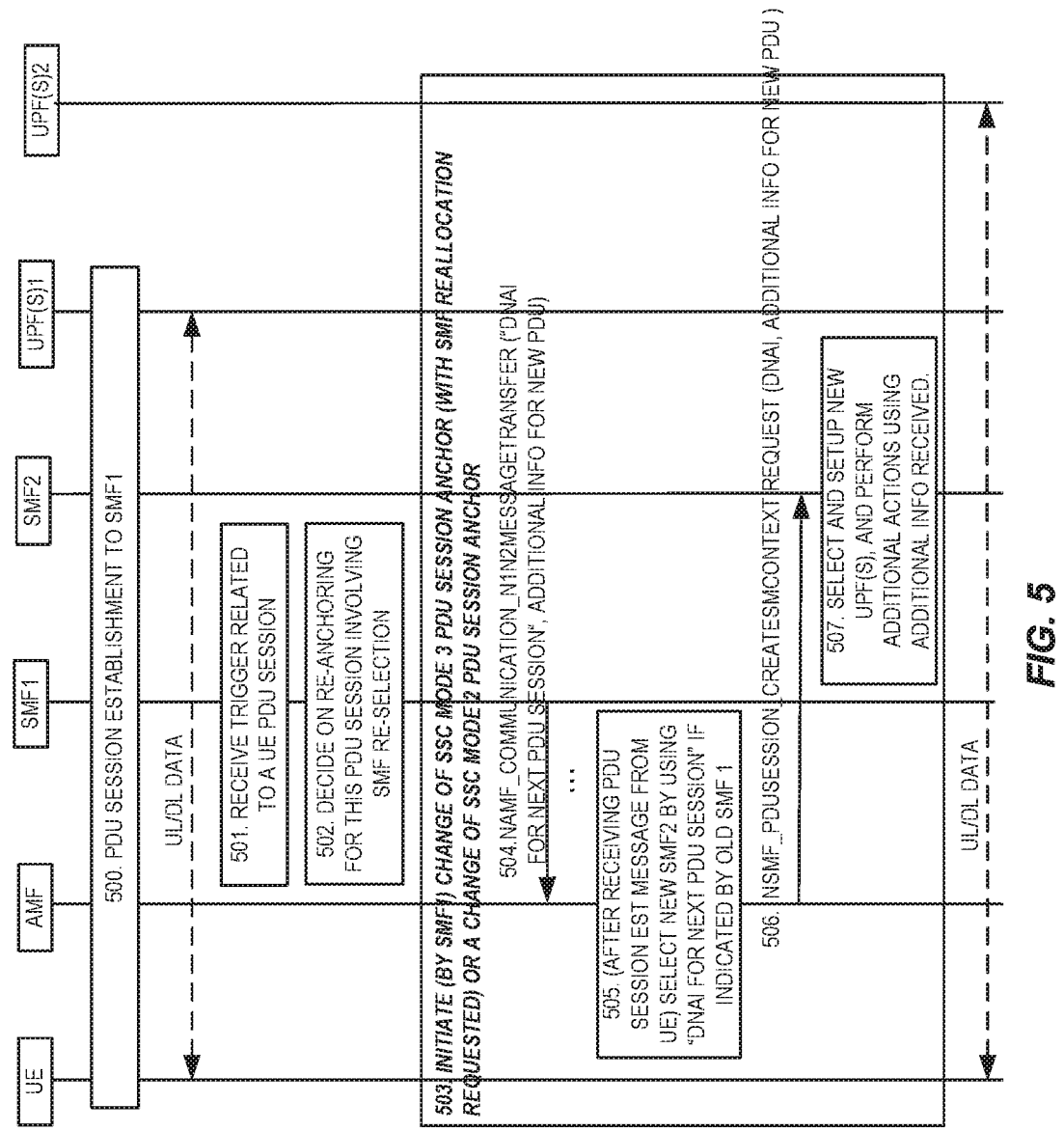
FIG. 5 illustrates exemplary communication flows for a
procedure for re-anchoring with Session Management Func-
tion (SMF) re-selection, according to some embodiments
disclosed herein.

In this regard, methods and apparatus for re-anchoring with SMF re-selection are disclosed. The generic functionality of a procedure for re-anchoring with SMF re-selection is illustrated in FIG. 5. The procedure shown in FIG. 5 assumes that the SMF comprises local logic and may have additional configuration (for example, local policies) to control this new functionality, including the information provided to AMF. As an example, these policies determine for each event whether DNAI identifies a specific DN access or whether there is a generic identifier for the closest PSA to the UE's current location. The policies may also include an identification of the additional information that needs to be provided. That additional information is referred herein to as the "EC dynamic context." The SMF may also take into consideration additional input received from the PCF (e.g., in PCCs for an AF request for an application), if any, that is relevant to this functionality, such as the time validity and spatial validity of an AF request. The SMF may further consider any additional information, such as information regarding whether user-application-related traffic has influenced the session, if any, and any additional configuration specific for that application, if any, for how the edge connectivity should be handled depending on the triggering event.

The procedure illustrated in FIG. 5 begins at step 500 with PDU Session establishment. The UE PDU session is established and has one or more anchors (in the session breakout scenario). In the session breakout scenario, insertion may be introduced both at establishment or in a session update (in this case, the same SMF is assumed to be able to control the insertion).

If the session breakout insertion may have been triggered by an AF request and corresponding PCC update towards SMF, the procedure may include details like temporal and spatial validity of the request that SMF stores and will consider in the handling of the re-anchoring in the future (e.g., whether the same DNAI should be maintained at mobility).

If the session breakout insertion may have been triggered by a DNS Query for an application or by deep packet inspection (DPI) detecting certain application traffic, any procedure specifics that may be relevant for how to handle a re-anchoring in the future are stored and considered by the SMF (e.g., the specific application that triggered the UL CL/Local PSA insertion).

At step 501, the SMF1 receives a trigger related to the UE PDU session.

At step 502, the SMF1 decides on re-anchoring for this PDU session. That decision could either be based on service-level agreement (SLA) information locally configured in the SMF, or on the PCCs received from PCF for the PDU Session. The SMF1 determines that SSC mode 2 or SSC mode 3 with SMF reallocation is to be used.

At step 503, the SMF1 initiates a Change PDU Session Anchor using one of the following methods:

SSC mode 3 with multiple PDU Sessions (clause 4.3.5.2 of TS 23.502) with SMF Reallocation request, or SSC mode 2 with different PDU Sessions (clause 4.3.5.1 of TS 23.502).

At step 504, in both cases, the SMF1 may send an indication to use "DNAI for next PDU session" to the AMF (e.g., in the N1 SM Information to the UE via the AMF by invoking the Namf_Communication_N1N2MessageTransfer message for SSC mode #2 or SSC mode #3 session re-establishment). The local configuration plus any additional input specific for the related applications (see step 500 and pre-requisites) is used to determine the information provided. The DNAI provided may identify a specific DN access, but it may also be a generic identifier to request the closest PSA to the UE's current location. The SMF1 may also send additional configuration information related to the new PDU session to the AMF. This EC dynamic context that SMF1 may convey towards AMF may include the following:

DNAI(s) for the local PSA(s);

Traffic filters (for session breakout scenarios);

N6 routing information;

DNS configuration (e.g., DNS server to be used by the UE in the new PDU session);

Subscribed AF information (in the case when PCF may not have the information); or Related local policies.

Note that some of the information may be possible to determine again by the new SMF based on local configuration or from the PCF. What needs to be provided as EC dynamic context is what depends on local configurations specific to the old SMF or information that the SMF has received/created dynamically for the PDU session. Also note that the SMF1 may send the EC dynamic context to AMF by invoking an additional Nsmf_EventExposure service operation. In this case, the Namf_Communication_N1N2MessageTransfer message is still issued (but without the EC dynamic context) to trigger session (re-)establishment. The AMF stores the information received in this EC dynamic context as it will need to be considered when UE sends the new PDU Session Establishment request to the same DN as instructed.

At step 505, when the AMF receives the UE PDU Session Establishment request to the same DN, the AMF selects a new SMF2 for the next PDU session establishment requested by the same UE taking into account if the AMF received the indication to use "DNAI for next PDU session" from the SMF1 in Step 504. If so, the AMF will use the DNAI received when selecting the new SMF (e.g., with assistance by NRF as proposed in TR 23.748 solution #50).

At step 506, the AMF conveys the received EC dynamic context information, including the DNAI received to the newly selected SMF2 during the next PDU session setup by the UE in the Nsmf_PDUSession_CreateSMContextRequest.

At step 507, based on the information received from the AMF, the SMF2 will select and set up the UPF(s) (including the ULCL/BP and additional local PSA(s) if needed) for this PDU session and perform additional actions if needed (e.g., setting MNO DNS for the PDU session or notifying the indicated AF). Note that usage reporting for the relevant EC flows may be activated to track activity. Further re-anchoring (to a central UPF) may be triggered if EC application terminates.

The procedure described above starts with receiving a trigger related to a specific APP to be started within this UE PDU session. There are multiple alternatives for this trigger (each implying a slightly different procedure), such as the following:

A DNS query from the UE. A new DNS component in the SMF is involved in the DNS communication of the UEs authorized for edge services (e.g., at session establishment, the SMF configures the required steering in the UPF). The DNS Query for the EC application FQDN is received by the SMF that authorizes the UE/service (domain) and the SMF checks if PSA relocation is needed. If so, the SMF initiates the re-anchoring procedure. The corresponding functionality is described below with respect to FIG. 6.

The MNO uses a DPI engine (e.g., at the UPF) to differentiate traffic of specific applications. Discovery of certain applications for certain users triggers a re-anchoring procedure involving a new SMF. Such traffic differentiation can be based in DPI as an example on the Transport Layer Security (TLS) client Server Name Indication (SNI), on destination IP ranges published or provided by the Application provider, etc.

The SMF receives from the AF a traffic steering request for a DNAI that is not configured in the SMF (either because it is outside the SMF service area or because it represents a "campus" with its own SMF, see Key Issue #5 in clause 5.5 of TR 23.748).

The SMF receives from an AF a traffic steering request for a DNAI (e.g., to provide session continuity because of planned EAS relocation, see Key Issue #2 in TR 23.748). The SMF decides on session re-anchoring. The given PDU session does not support change of PSA using SSC mode 3, so SMF decides that a change of PSA using SSC mode 2 is needed.

As above, the SMF receives from an AF a traffic steering request for a DNAI (in order to support service continuity during EAS relocation, related to Key Issue #2 in TR 23.748). The DNAI requested is not configured in the SMF, so the SMF decides to perform an SSC mode 3 change of PSA with SMF change. The new SMF will need the information on how to configure the new local PSA (DNAI, traffic filters) towards the application.

As above, but the decision to re-anchor to another DNAI is based on SMF configuration or previous AF interaction and triggered by UE mobility.

Figure 6:
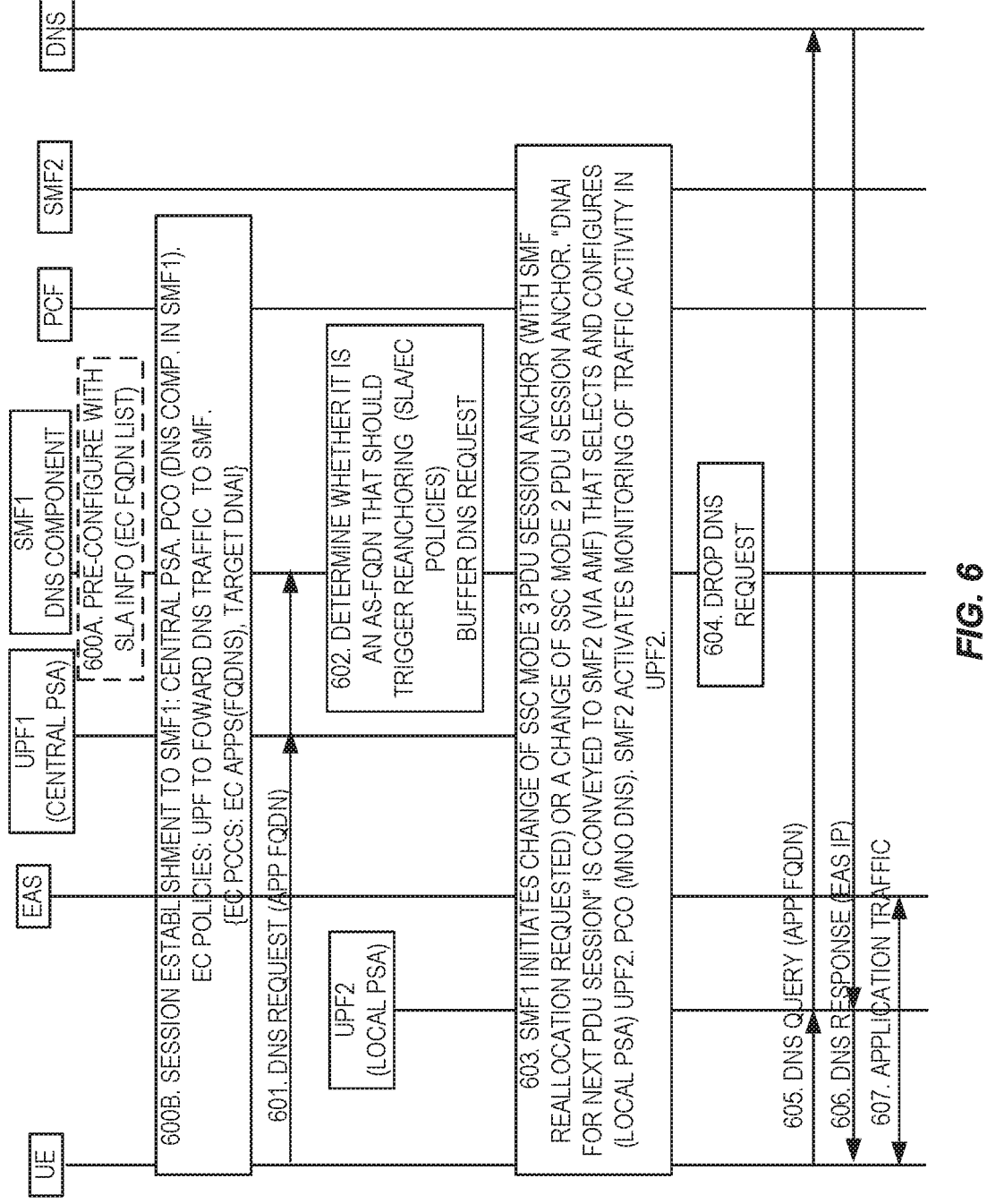
FIG. 6 illustrates exemplary communication flows for a
procedure for re-anchoring with change of SMF at edge
application discovery, according to some embodiments dis-
closed herein; procedure for re-anchoring with change of
SMF at edge application discovery.

FIG. 6 illustrates a procedure for re-anchoring with change of SMF at edge application discovery. The illustrated procedure is based on solution #12 of TS 23.728.

At step 600*a* of FIG. 6, the SMF is pre-configured with SLA info (e.g., which EC Application FQDNs would trigger session re-anchoring).

At step 600*b*, PDU Session establishment takes place. The SMF instructs the UPF to forward the DNS traffic to the SMF.

At step 601, the EC service is identified by a FQDN, the AS-FQDN. The application in the UE does a DNS discovery request to discover the EAS. The DNS request is forwarded by central PSA (UPF1) to the SMF1.

At step 602, the SMF1 checks whether the received FQDN is an AS-FQDN. If so, the SMF1 buffers the DNS request. That decision could either be based on SLA information locally configured in SMF, or on the PCCs received from PCF for the PDU Session. The SMF1 determines that SSC mode 2 or SSC mode 3 with SMF relocation is to be used.

At step 603, the SMF1 initiates a Change PDU Session Anchor for SSC mode 2 or SSC mode 3 (as described in sections 4.3.5.1 and 4.3.5.2 of TS 23.205). The SMF1 request includes the EC related information as needed and described in Step 504 of FIG. 5. When the AMF receives the UE PDU Session Establishment request to the same DN, the SMF2 will be selected by the AMF according to this information, and the SMF2 will select the UPF2 (i.e., the local PSA) for this PDU session as described in Step 505 of the generic procedure in FIG. 5. Also, the AMF conveys the received EC related information, including the DNAI received by the newly selected SMF2 as described in Step 506 of the generic procedure in FIG. 5. Usage reporting for the relevant EC flows is activated to track activity.

At step 604, the SMF1 drops the DNS request.

At step 605, the UE sends again the DNS query (after expiration of a timer at the UE). The DNS query goes through the Local PSA to the DNS resolver provided at the session establishment of the new session, and it is resolved to an Edge AS.

At step 606, the DNS response can be tuned to be closest to the new PSA.

At step 607, the Application Traffic then starts towards the selected Edge AS.

Figure 7:
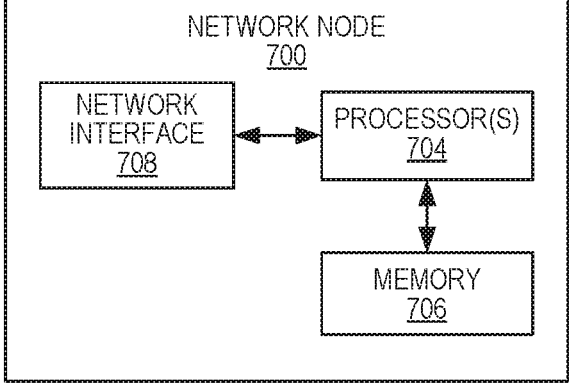
FIG. 7 is a schematic block diagram of a radio access node
according to some embodiments of the present disclosure.

FIG. 7 is a schematic block diagram of a network node 700 according to some embodiments of the present disclosure. Optional features are represented by dashed boxes. The network node 700 may be, for example, a network node that implements all or part of the functionality of an NF (e.g., an SMF or PCF) or an AF in accordance with any of the embodiments described herein. As illustrated, the network node 700 includes one or more processors 704 (e.g., Central Processing Units (CPUs), Application Specific Integrated Circuits (ASICs), Field Programmable Gate Arrays (FP-GAs), and/or the like), memory 706, and a network interface 708. The one or more processors 704 are also referred to herein as processing circuitry. The one or more processors 704 operate to provide one or more functions of NF (e.g., SMF or AMF) or AF as described herein. In some embodiments, the function(s) are implemented in software that is stored, e.g., in the memory 706 and executed by the one or more processors 704.

Figure 8:
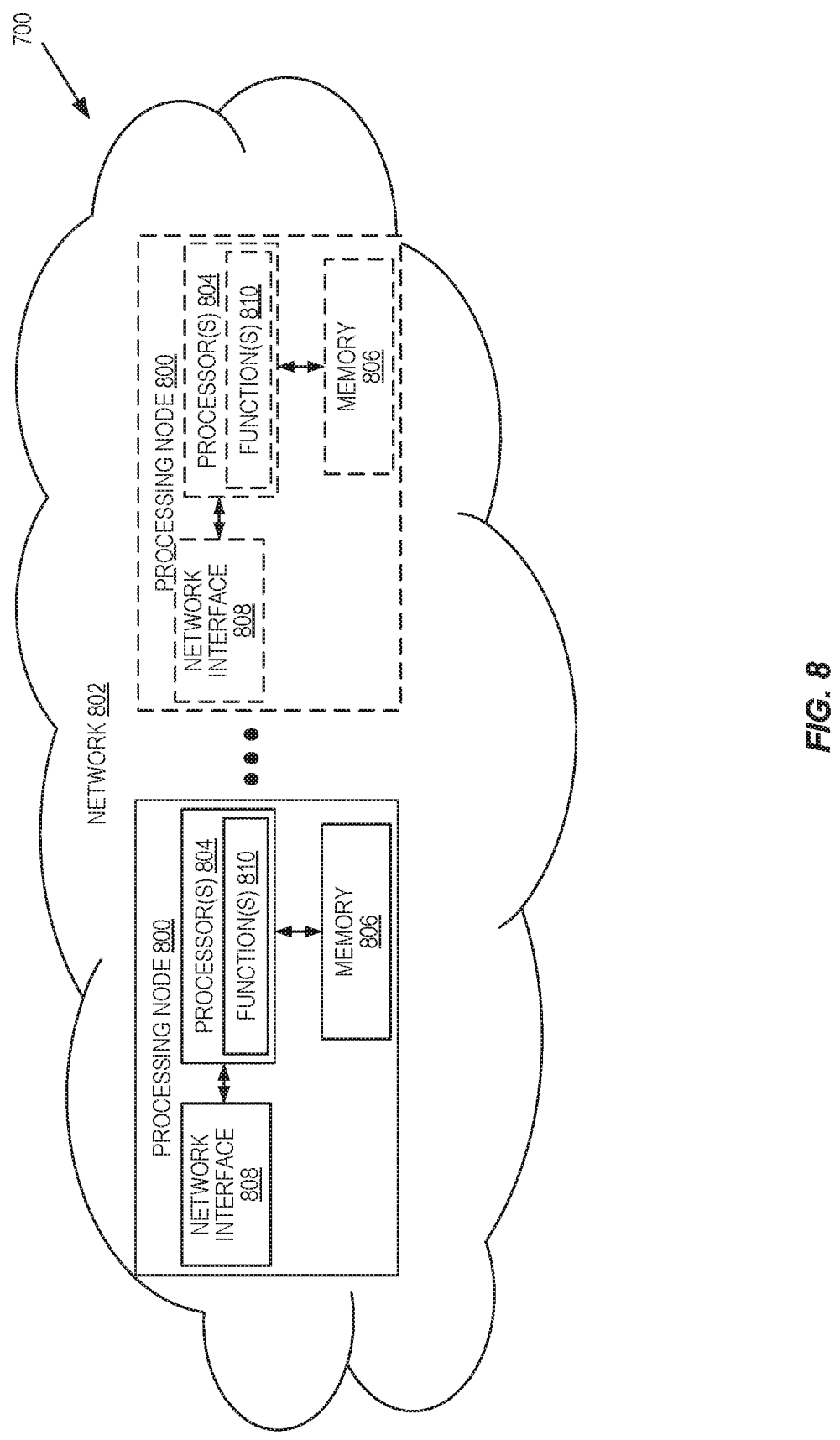
FIG. 8 is a schematic block diagram that illustrates a
virtualized embodiment of the radio access node of FIG. 7
according to some embodiments of the present disclosure.

FIG. 8 is a schematic block diagram that illustrates a virtualized embodiment of the network node 700 according to some embodiments of the present disclosure. As used herein, a "virtualized" network node is an implementation of the network node 700 in which at least a portion of the functionality of the network node 700 is implemented as a virtual component(s) (e.g., via a virtual machine(s) executing on a physical processing node(s) in a network(s)). As illustrated, in this example, the network node 700 includes one or more processing nodes 800 coupled to or included as part of a network(s) 802. Each processing node 800 includes one or more processors 804 (e.g., CPUs, ASICs, FPGAs, and/or the like), memory 806, and a network interface 808.

In this example, functions 810 of the network node 700 described herein (e.g., one or more functions of the NF (e.g., SMF or AMF) or AF described herein) are implemented at the one or more processing nodes 800 or distributed across the two or more processing nodes 800 in any desired manner. In some particular embodiments, some or all of the functions 810 of the network node 700 described herein are implemented as virtual components executed by one or more virtual machines implemented in a virtual environment(s) hosted by the processing node(s) 800.

In some embodiments, a computer program including instructions which, when executed by at least one processor, cause the at least one processor to carry out the functionality of the network node 700 or a node (e.g., a processing node 800) implementing one or more of the functions 810 of the network node 700 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 9:
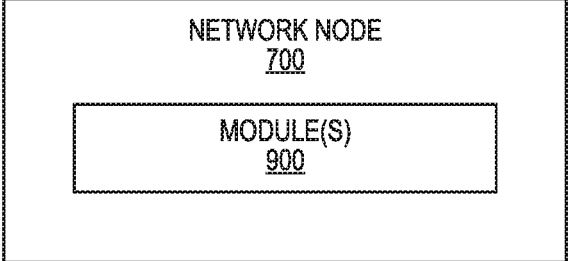
FIG. 9 is a schematic block diagram of the radio access
node of FIG. 7 according to some other embodiments of the
present disclosure.

FIG. 9 is a schematic block diagram of the network node 700 according to some other embodiments of the present disclosure. The network node 700 includes one or more modules 900, each of which is implemented in software. The module(s) 900 provide the functionality of the network node 700 described herein (e.g., one or more functions of an NF (e.g., SMF or AMF) or AF as described herein). This discussion is equally applicable to the processing node 800 of FIG. 8 where the modules 900 may be implemented at one of the processing nodes 800 or distributed across multiple processing nodes 800.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.)

While not being limited thereto, some example embodiments of the present disclosure are provided below.

Embodiment 1: A method performed in a core network of a cellular communications system to perform re-anchoring with System Management Function, SMF, re-selection, the method comprising:

at a first SMF:

determining that a current Protocol Data Unit, PDU, Session Anchor, PSA, for a User Equipment, UE, PDU session is to be relocated, and that relocation requires an SMF re-selection; and initiating re-establishment of the UE PDU session, wherein initiating comprises conveying, to an Access and Mobility Management Function, AMF, Edge Computing, EC, dynamic context information relevant for a new UE PDU session;

at the AMF:

receiving the EC dynamic context information from the first SMF;

selecting a second SMF based on the EC dynamic context information; and transmitting the EC dynamic context information to the second SMF; and at the second SMF:

receiving the EC dynamic context information from the AMF; and establishing the new UE PDU session based on the EC dynamic context information, wherein establishing the new UE PDU session comprises:

selecting a PSA for the new UE PDU session; and configuring the PSA for the new UE PDU session.

Embodiment 2: The method of embodiment 1, wherein the EC dynamic context information comprises one or more of:

one or more Data Network Access Identifiers, DNA's, for a corresponding one or more PSAs;

one or more traffic filters;

N6 routing information;

Domain Name System, DNS, configuration information;

Subscribed Application Function, AF, information; or related local policies.

Embodiment 3: A method performed in a first Session Management Function, SMF, in a core network of a cellular communications system to perform re-anchoring with SMF re-selection, the method comprising:

determining that a current Protocol Data Unit, PDU, Session Anchor, PSA, for a User Equipment, UE, PDU session is to be relocated, and that relocation requires an SMF re-selection; and initiating re-establishment of the UE PDU session, wherein initiating comprises conveying, to an Access and Mobility Management Function, AMF, Edge Computing, EC, dynamic context information relevant for a new UE PDU session.

Embodiment 4: A first Session Management Function, SMF, for a core network of a cellular communications system where the first SMF is enabled to perform re-anchoring with SMF re-selection, the first SMF adapted to:

determine that a current Protocol Data Unit, PDU, Session Anchor, PSA, for a User Equipment, UE, PDU session is to be relocated, and that relocation requires an SMF re-selection; and initiate re-establishment of the UE PDU session, wherein initiating comprises conveying, to an Access and Mobility Management Function, AMF, Edge Computing, EC, dynamic context information relevant for a new UE PDU session.

Embodiment 5: A network node for implementing a first Session Management Function, SMF, for a core network of a cellular communications system where the first SMF is enabled to perform re-anchoring with SMF re-selection, the network node comprising:

a network interface; and processing circuitry associated with the network interface, the processing circuitry adapted to cause the network node to implement the first SMF such that the first SMF is configured to:

determine that a current Protocol Data Unit, PDU, Session Anchor, PSA, for a User Equipment, UE, PDU session is to be relocated, and that relocation requires an SMF re-selection; and initiate re-establishment of the UE PDU session, wherein initiating comprises conveying, to an Access and Mobility Management Function, AMF, Edge Computing, EC, dynamic context information relevant for a new UE PDU session.

Embodiment 6: A method performed in an Access and Mobility Management Function, AMF, in a core network of a cellular communications system to perform re-anchoring with SMF re-selection, the method comprising:

receiving Edge Computing, EC, dynamic context information from a first Session Management Function, SMF;

selecting a second SMF based on the EC dynamic context information; and transmitting the EC dynamic context information to the second SMF.

Embodiment 7: The method of embodiment 6, wherein selecting the second SMF based on the EC dynamic context information comprises:

determining that the EC dynamic context information comprises an indication to use a Data Network Access Identifier, DNAI, for a new UE PDU session; and using the DNAI when selecting the second SMF.

Embodiment 8: An Access and Mobility Management Function, AMF, for a core network of a cellular communications system where the AMF is enabled to perform re-anchoring with SMF re-selection, the AMF adapted to:

receive Edge Computing, EC, dynamic context information from a first Session Management Function, SMF;

select a second SMF based on the EC dynamic context information; and transmit the EC dynamic context information to the second SMF.

Embodiment 9: The AMF of embodiment 8, wherein the AMF is adapted to select the second SMF based on the EC dynamic context information by being adapted to:

determine that the EC dynamic context information comprises an indication to use a Data Network Access Identifier, DNAI, for a new UE PDU session; and use the DNAI when selecting the second SMF.

Embodiment 10: A network node for implementing an Access and Mobility Management Function, AMF, for a core network of a cellular communications system where the AMF is enabled to perform re-anchoring with SMF re-selection, the network node comprising:

a network interface; and processing circuitry associated with the network interface, the processing circuitry adapted to cause the network node to implement the AMF such that the AMF is configured to:

receive Edge Computing, EC, dynamic context information from a first Session Management Function, SMF;

select a second SMF based on the EC dynamic context information; and transmit the EC dynamic context information to the second SMF.

Embodiment 11: The network node of embodiment 10, wherein the AMF is configured to select the second SMF based on the EC dynamic context information by being configured to:

determine that the EC dynamic context information comprises an indication to use a Data Network Access Identifier, DNAI, for a new UE PDU session; and using the DNAI when selecting the second SMF.

Embodiment 12: A method performed in a second Session Management Function, SMF, in a core network of a cellular communications system to perform re-anchoring with SMF re-selection, the method comprising:

receiving Edge Computing, EC, dynamic context information from an Access and Mobility Management Function, AMF; and establishing a new User Equipment, UE, Protocol Data Unit, PDU, session based on the EC dynamic context information.

Embodiment 13: The method of embodiment 12, wherein establishing the new UE PDU session based on the EC dynamic context information comprises:

selecting a PDU Session Anchor, PSA, for the new UE PDU session; and configuring the PSA for the new UE PDU session.

Embodiment 14: A second Session Management Function, SMF, for a core network of a cellular communications system where the second SMF is enabled to perform re-anchoring with SMF re-selection, the second SMF adapted to:

receive Edge Computing, EC, dynamic context information from an Access and Mobility Management Function, AMF; and establish a new User Equipment, UE, Protocol Data Unit, PDU, session based on the EC dynamic context information.

Embodiment 15: The second SMF of embodiment 14, wherein the second SMF is adapted to establish the new UE PDU session based on the EC dynamic context information by being adapted to:

select a PDU Session Anchor, PSA, for the new UE PDU session; and configure the PSA for the new UE PDU session.

Embodiment 16: A network node for implementing a second Session Management Function, SMF, for a core network of a cellular communications system where the second SMF is enabled to perform re-anchoring with SMF re-selection, the network node comprising:

a network interface; and processing circuitry associated with the network interface, the processing circuitry adapted to cause the network node to implement the second SMF such that the second SMF is configured to:

receive Edge Computing, EC, dynamic context information from an Access and Mobility Management Function, AMF; and establish a new User Equipment, UE, Protocol Data Unit, PDU, session based on the EC dynamic context information.

Embodiment 17: The network node of embodiment 16, wherein the second SMF is configured to establish the new UE PDU session based on the EC dynamic context information by being configured to:

select a PDU Session Anchor, PSA, for the new UE PDU session; and configure the PSA for the new UE PDU session.

Embodiment 18: The method of any one of embodiments 3, 6, 7, 12, and 13, wherein the EC dynamic context information comprises one or more of:

one or more Data Network Access Identifiers, DNA's, for a corresponding one or more PSAs;

one or more traffic filters;

N6 routing information;

Domain Name System, DNS, configuration information;

Subscribed Application Function, AF, information; or related local policies.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project

5G Fifth Generation

5GC Fifth Generation Core

5GS Fifth Generation System

AF Application Function

AMF Access and Mobility Function

AN Access Network

AP Access Point

ASIC Application Specific Integrated Circuit

AUSF Authentication Server Function

CPU Central Processing Unit

DN Data Network

DSP Digital Signal Processor eNB Enhanced or Evolved Node B

EPS Evolved Packet System

E-UTRA Evolved Universal Terrestrial Radio Access

FPGA Field Programmable Gate Array gNB New Radio Base Station gNB-DU New Radio Base Station Distributed Unit HSS Home Subscriber Server IoT Internet of Things IP Internet Protocol LTE Long Term Evolution MME Mobility Management Entity MTC Machine Type Communication NEF Network Exposure Function NF Network Function NR New Radio NRF Network Function Repository Function NSSF Network Slice Selection Function OTT Over-the-Top PC Personal Computer PCF Policy Control Function P-GW Packet Data Network Gateway QoS Quality of Service RAM Random Access Memory RAN Radio Access Network ROM Read Only Memory
RRH Remote Radio Head
RTT Round Trip Time
SCEF Service Capability Exposure Function
SMF Session Management Function
UDM Unified Data Management
UE User Equipment
UPF User Plane Function Those skilled in the art will recognize improvements and modifications to the embodiments of the present disclosure. All such improvements and modifications are considered within the scope of the concepts disclosed herein.

What is claimed is:

1. A method performed in a core network of a cellular communications system to perform re-anchoring with System Management Function, SMF, re-selection, the method comprising:

at a first SMF:

receiving a trigger related to a User Equipment, UE, Protocol Data Unit, PDU, session, wherein the trigger comprises one of an Application Function, AF, request or a Domain Name System, DNS, query from the UE;

responsive to receiving the trigger, determining, based on the trigger, that a current PDU Session Anchor, PSA, for the UE PDU session is to be relocated, and that relocation requires an SMF re-selection, wherein determining based on the trigger comprises determining that a new UE location is outside a service area of the first SMF, that DNS-triggered or AF-requested Data Network Access Identifier, DNAI, is to be supported with distributed anchor, that the first SMS does not control any local PSA, or that an AF requests a DNAI that is not controlled by the first SMF; and initiating re-establishment of the UE PDU session, wherein initiating comprises conveying, to an Access and Mobility Management Function, AMF, Edge Computing, EC, dynamic context information relevant for a new UE PDU session;

at the AMF:

receiving the EC dynamic context information from the first SMF;

selecting a second SMF based on the EC dynamic context information; and transmitting the EC dynamic context information to the second SMF; and at the second SMF:

receiving the EC dynamic context information from the AMF; and establishing the new UE PDU session based on the EC dynamic context information, wherein establishing the new UE PDU session comprises:

selecting a PSA for the new UE PDU session; and configuring the PSA for the new UE PDU session;

wherein the EC dynamic context information comprises one or more of:

information about a Data Network Access Identifier (DNAI) for a new User Equipment (UE) Protocol Data Unit (PDU) session;

one or more traffic filters;

N6 routing information;

DNS configuration information;

Subscribed AF information; or related local policies.

2. A method performed in a first Session Management Function, SMF, in a core network of a cellular communications system to perform re-anchoring with SMF re-selection, the method comprising:

receiving a trigger related to a User Equipment, UE, Protocol Data Unit, PDU, session, wherein the trigger comprises one of an Application Function, AF, request or a Domain Name System, DNS, query from the UE;

responsive to receiving the trigger, determining, based on the trigger, that a current PDU Session Anchor, PSA, for the UE PDU session is to be relocated, and that relocation requires an SMF re-selection, wherein determining based on the trigger comprises determining that a new UE location is outside a service area of the first SMF, that DNS-triggered or AF-requested Data Network Access Identifier, DNAI, is to be supported with distributed anchor, that the first SMS does not control any local PSA, or that an AF requests a DNAI that is not controlled by the first SMF; and initiating re-establishment of the UE PDU session, wherein initiating comprises conveying, to an Access and Mobility Management Function, AMF, Edge Computing, EC, dynamic context information relevant for a new UE PDU session;

wherein the EC dynamic context information comprises one or more of:

information about a Data Network Access Identifier (DNAI) for a new User Equipment (UE) Protocol Data Unit (PDU) session.

3. A network node for implementing a first Session Management Function, SMF, for a core network of a cellular communications system where the first SMF is enabled to perform re-anchoring with SMF re-selection, the network node comprising:

a network interface; and processing circuitry associated with the network interface, the processing circuitry configured to:

receive a trigger related to a User Equipment, UE, Protocol Data Unit, PDU, session, wherein the trigger comprises one of an Application Function, AF, request or a Domain Name System, DNS, query from the UE;

responsive to receiving the trigger, determine, based on the trigger, that a current PDU Session Anchor, PSA, for the UE PDU session is to be relocated, and that relocation requires an SMF re-selection, wherein the processing circuitry is configured to determine based on the trigger by being configured to determine that a new UE location is outside a service area of the first SMF, that DNS-triggered or AF-requested Data Network Access Identifier, DNAI, is to be supported with distributed anchor, that the first SMS does not control any local PSA, or that an AF requests a DNAI that is not controlled by the first SMF; and initiate re-establishment of the UE PDU session, wherein initiating comprises conveying, to an Access and Mobility Management Function, AMF, Edge Computing, EC, dynamic context information relevant for a new UE PDU session;

wherein the EC dynamic context information comprises one or more of:

information about a Data Network Access Identifier (DNAI) for a new User Equipment (UE) Protocol Data Unit (PDU) session;

one or more traffic filters;

N6 routing information;

DNS configuration information;

Subscribed AF information; or related local policies.

4. A method performed in an Access and Mobility Management Function, AMF, in a core network of a cellular communications system to perform re-anchoring with Session Management Function, SMF, re-selection, the method comprising:

receiving Edge Computing, EC, dynamic context information from a first SMF, the EC dynamic context information comprising information about a Data Network Access Identifier (DNAI) for a new User Equipment (UE) Protocol Data Unit (PDU) session;

selecting a second SMF for the new UE PDU session for the UE based on the EC dynamic context information, comprising using the DNAI when selecting the second SMF for the new UE PDU Session; and transmitting the EC dynamic context information to the second SMF.

5. The method of claim 4, wherein the EC dynamic context information further comprises at least one of:

one or more traffic filters;

N6 routing information;

Domain Name System, DNS, configuration information;

Subscribed Application Function, AF, information; or related local policies.

6. A network node for implementing an Access and Mobility Management Function, AMF, for a core network of a cellular communications system where the AMF is enabled to perform re-anchoring with Session Management Function, SMF re-selection, the network node comprising:

a network interface; and processing circuitry associated with the network interface, the processing circuitry configured to:

receive Edge Computing, EC, dynamic context information from a first SMF, the EC dynamic context information comprising information about a Data Network Access Identifier (DNAI) for a new User Equipment (UE) Protocol Data Unit (PDU) session;

select a second SMF for the new UE PDU session for the UE based on the EC dynamic context information, comprising using the DNAI when selecting the second SMF for the new UE PDU Session; and transmit the EC dynamic context information to the second SMF.

7. The network node of claim 6, wherein the EC dynamic context information further comprises at least one of:

one or more traffic filters;

N6 routing information;

Domain Name System, DNS, configuration information;

Subscribed Application Function, AF, information; or related local policies.

8. A method performed in a second Session Management Function, SMF, in a core network of a cellular communications system to perform re-anchoring with SMF re-selection, the method comprising:

receiving Edge Computing, EC, dynamic context information from an Access and Mobility Management Function, AMF, the EC dynamic context information comprising information about a Data Network Access Identifier (DNAI) for a new User Equipment (UE) Protocol Data Unit (PDU) session; and establishing the new UE PDU Session for the UE based on the EC dynamic context information, comprising selecting a PDU Session Anchor (PSA) for the new UE PDU Session and configuring the PSA for the new PDU Session.

9. The method of claim 8, wherein the EC dynamic context information further comprises at least one of:

one or more traffic filters;

N6 routing information;

Domain Name System, DNS, configuration information;

Subscribed Application Function, AF, information; or related local policies.

10. A network node for implementing a second Session Management Function, SMF, for a core network of a cellular communications system where the second SMF is enabled to perform re-anchoring with SMF re-selection, the network node comprising:

a network interface; and processing circuitry associated with the network interface, the processing circuitry configured to:

receive Edge Computing, EC, dynamic context information from an Access and Mobility Management Function, AMF, the EC dynamic context information comprising information about a Data Network Access Identifier (DNAI) for a new User Equipment (UE) Protocol Data Unit (PDU) session; and establish the new UE PDU Session for the UE based on the EC dynamic context information, comprising selecting a PDU Session Anchor (PSA) for the new UE PDU Session and configuring the PSA for the new PDU Session.

11. The network node of claim 10, wherein the EC dynamic context information further comprises at least one of:

one or more traffic filters;

N6 routing information;

Domain Name System, DNS, configuration information;

Subscribed Application Function, AF, information; or related local policies.

* * * * *